(12) United States Patent
Sarafudinov

(10) Patent No.: US 8,762,934 B2
(45) Date of Patent: Jun. 24, 2014

(54) METHOD OF EXTENSIBLE BUSINESS OBJECT MODELING AND GENERATION OF SYSTEM ARTIFACTS FROM THE MODELS

(76) Inventor: Serghei Sarafudinov, Belle Mead, NJ (US)

( * ) Notice: Subject to any disclaimer, the term of this patent is extended or adjusted under 35 U.S.C. 154(b) by 922 days.

(21) Appl. No.: 12/906,050

(22) Filed: Oct. 15, 2010

(65) Prior Publication Data

US 2012/0096426 A1 Apr. 19, 2012

(51) Int. Cl.
*G06F 9/44* (2006.01)
*G06F 9/45* (2006.01)
*G05B 13/02* (2006.01)

(52) U.S. Cl.
USPC ............ 717/104; 700/29; 700/30; 700/31; 703/22

(58) Field of Classification Search
USPC ................................................ 717/104
See application file for complete search history.

(56) References Cited

U.S. PATENT DOCUMENTS

| | | | | |
|---|---|---|---|---|
| 5,999,102 | A * | 12/1999 | Mitsui et al. | 340/636.1 |
| 2002/0087596 | A1* | 7/2002 | Lewontin | 707/513 |
| 2004/0167894 | A1* | 8/2004 | Ziv | 707/9 |
| 2006/0058990 | A1* | 3/2006 | Burgel et al. | 703/22 |
| 2006/0059167 | A1* | 3/2006 | Burgel et al. | 707/100 |
| 2009/0037502 | A1* | 2/2009 | Gupta et al. | 717/104 |

OTHER PUBLICATIONS

IBM et al., "Generation of data objects for model based testing from XML (Extended Markup Language) schema," Sep. 9, 2003, ip.com, 4pg.*
Lampathaki et al., "Business to business interoperability: A current review of XML data integration standards," 2008, Elsevier B.V., 11pg.*

* cited by examiner

*Primary Examiner* — Ryan Coyer

(57) ABSTRACT

A method for defining XML-based models of logical type hierarchies, business objects and sub-objects, business object operations, enumerations and reusable structures and fieldsets. The method defines an optimal, yet extensible, structure of the object models to simplify the modeling process by capturing the most essential elements of the model and inferring any additional information, such as relationship between objects, during the process of generating code, database scripts or other system artifacts from the model. Methods of generating a relational model and a presentation data model from such a business object model.

18 Claims, 10 Drawing Sheets

METHOD OF EXTENSIBLE BUSINESS OBJECT MODELING AND GENERATION OF SYSTEM ARTIFACTS FROM THE MODELS

TECHNICAL FIELD

The invention relates generally to model-driven computer software development systems and specifically to methods for modeling business objects and generating other system artifacts from the models.

BACKGROUND ART

As development teams strive for increased productivity, Model Driven Development (MDD) has been gaining momentum lately with a promise of more clean, consistent and robust system designs, faster development by generating most of the plumbing code from the model(s), and better system portability from one platform to another.

Most notably MDD has been formalized by the Object Management Group with their Model Driven Architecture® (MDA) approach and there are already a number of vendors that implement or support MDA. The MDA is mostly oriented around the Unified Modeling Language (UML) specification.

UML models are typically represented in a graphical format as diagrams, which require vendor-specific editors and may not allow simultaneous editing or they make change control management quite difficult.

While UML can be extensible with a use of such features as stereotypes, it doesn't seem to be flexible enough for defining arbitrary models, and the learning curve for UML seems to be fairly steep. Additionally, each vendor has to provide proprietary engines and custom transformation languages to perform model transformations.

On the other hand, Model Driven Development based on Extensible Markup Language (XML) can leverage a variety of standard XML technologies such as Extensible Stylesheet Language Transformations (XSLT), XML Schema Definitions (XSD), etc. to allow defining any types of models in an XML format. You can view and edit XML models with any text editor and easily compare, merge or version-control them. You can define a grammar (meta-model) for your models with XSD schemas, which can also be used to validate the models and to prompt the allowed tags and attributes in XSD-aware XML editors. You can then use the standard XSLT technology to further validate the XML model beyond the limitations of the XSD validation and to finally transform the model into other system artifacts, such as code, database scripts, documentation etc.

In both cases, to maximize the benefits of the code generation, the generation process needs to be set up in such a way that the developers would never have to manually change the generated code, but rather extend it separately, so that the generated artifacts can be regenerated at any later point if the model has changed. This will ensure that the models are always in synch with the actual code.

Some modeling methods already store their models in XML format and provide some graphical tools for editing them, such as the Entity Data Models (EDM) that consist of conceptual models, storage models and the mappings between the two models. However defining such models directly in XML without using a special graphical tool could be extremely hard for the users as the XML format the models are using tends to be pretty verbose and is not designed to be created or edited manually by the users.

SUMMARY OF INVENTION

The present invention provides a solution to the above described problems by describing a method for defining XML-based business object models that defines an optimal, yet extensible, structure of the object models to simplify the modeling process by capturing the most essential elements of the model and inferring any additional information, such as relationship between objects, during the process of generating code, database scripts or other system artifacts from the model.

Most of the existing object models include explicit definitions of relationships between the objects. The subject innovation, by contrast, uses the inherent object structure and the types of the object fields to infer the relationships between the objects. For example, sub-objects are considered to automatically have a relationship to their parent object and the parent object key is implicitly included in the sub-objects.

By imposing certain uniqueness rules on the key object fields, a relationship between two objects can be now inferred from the types of the object fields or from the field-sets being referenced.

While other models use a fixed set of primitive types for their object fields and resort to using external mappings for those types during the code generation, the subject method allows defining and using an extensible hierarchy of logical types right within the model, wherein each logical type can define its own mappings to other kinds of types, such as database types or programming language types, and also inherit such mappings from its base type. This approach significantly simplifies defining and maintaining the mappings for the logical types as well as ensures consistency between object model fields, so that the fields of the same or compatible logical types could be mapped to the same physical types.

Instead of explicitly defining mappings between the model business objects and physical data tables or programmable data objects for the code generation, the present method uses the object and field names to provide the mapping implicitly, while also allowing to override it for any particular object or field.

Typically other modeling methods that allow describing object operations require defining a separate Value Object structure, which will be used for the operation input or output. While the current method also allows standalone reusable structures to be used for operations' input or output, it also allows defining the operation structures in-line for each operation.

The present innovation also describes a method for generation of the presentation layer data model objects from the structure of the business object operations rather than from the business object fields. This allows generating a more appropriate presentation data models as compared to the existing methods.

Other features and benefits that characterize embodiments of the present invention will be apparent upon reading the following detailed description and review of the associated drawings.

DESCRIPTION OF EMBODIMENTS

While using XML format for business object models described herein could be advantageous due to the wide industry support and abundance of vendor tools and technologies, workers skilled in the art will recognize that any other textual format could be used instead to implement the present method and that other changes may be made in form and detail without departing from the spirit and scope of the invention.

Figure 1:
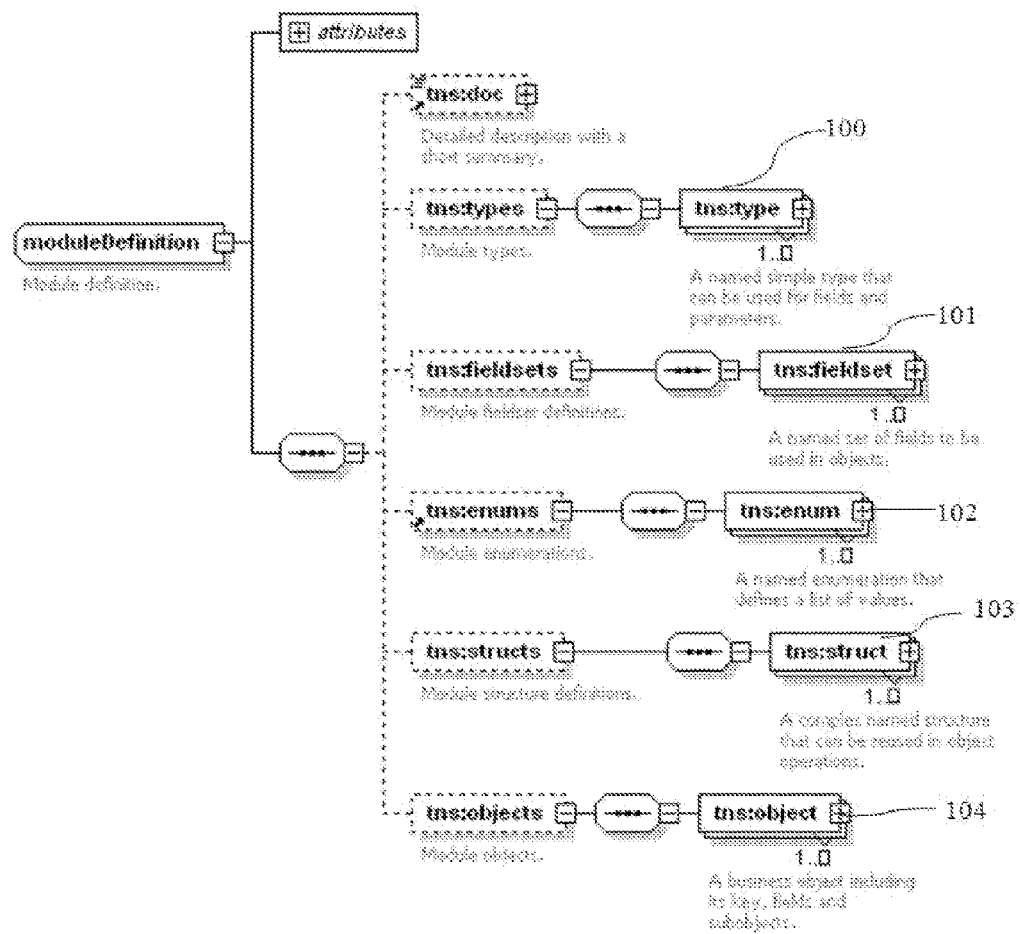
FIG. 1 is a block diagram illustrating a general structure of the business object model.

FIG. 1 illustrates a general structure of the business object model that consist of logical modules that group a plurality of definitions of various entities such as logical types 100, reusable named sets of fields, hereinafter referred to as field-sets 101, enumerations of possible values for certain logical types 102, reusable named structures 103 that can be used in the object operations or other structures and the definition of the actual business objects 104 including their sub-objects.

Logical Type Hierarchies

The present method allows defining a plurality of logical type hierarchies right in the model. The declared types are then used in other model elements, such as object fields or parameters. Any type may extend another type and inherit its properties and additional configuration, such as a mapping to a corresponding physical type, e.g. SQL type, which can be overridden in the derived type. If certain configuration is not specified in the derived type, the one from the base type will typically be used.

Figure 2:
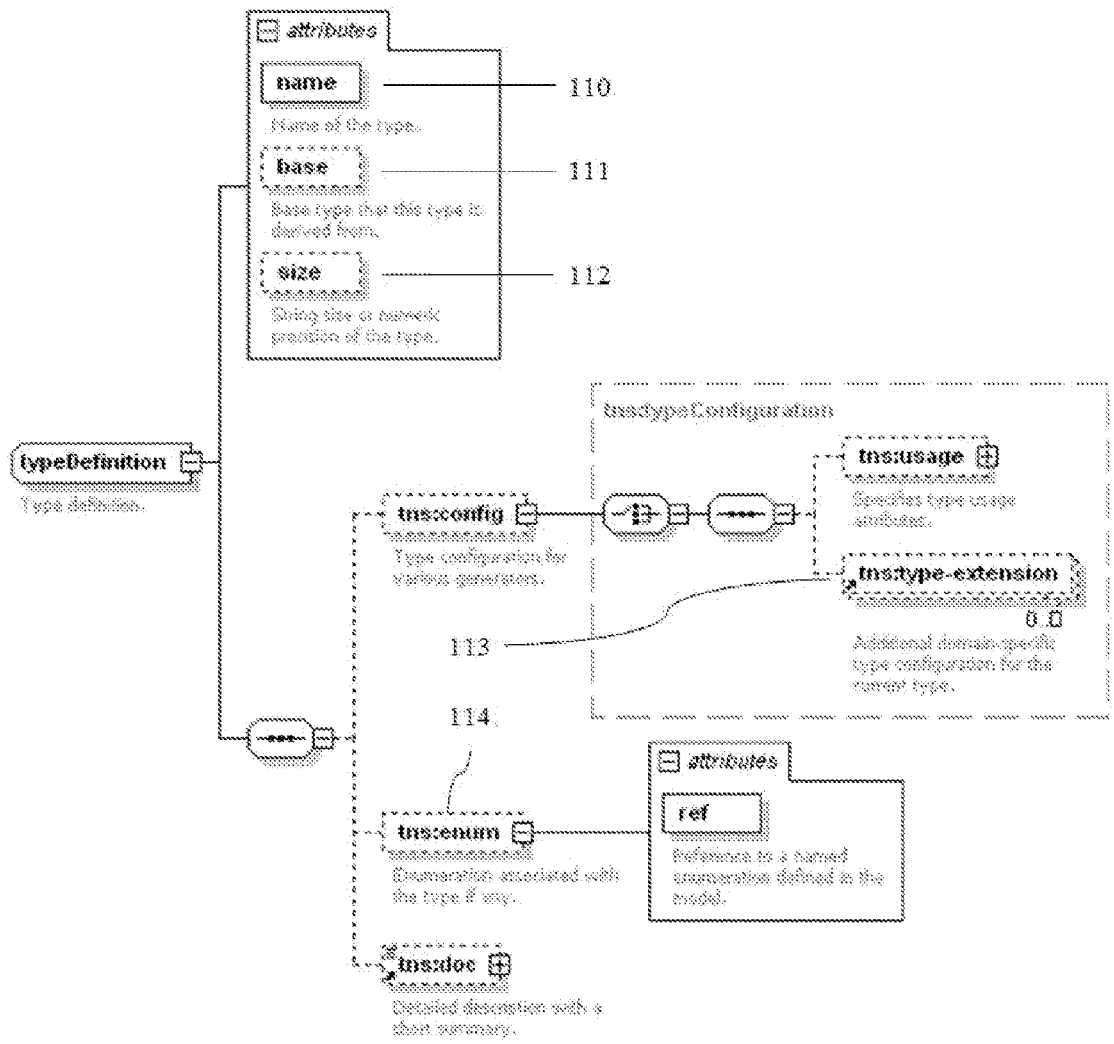
FIG. 2 is a block diagram illustrating the structure of logical types defined in the model.

FIG. 2 illustrates the structure of logical types defined in the model. Each type has a unique name 110 that allows referencing this type from within the model. The optional base attribute 111 refers to the base type that the current type is derived from. This attribute is omitted for the root type of each hierarchy. The types may also have a size attribute 112 that defines its maximum length for string-based types. A logical type may also be associated with an existing enumeration 114 to indicate the list of possible values whenever such list can be statically defined. Finally, each logical type provides an extension point 113 where you can specify the mappings to different physical types or associations with other entities such as UI controls.

Generally, a type hierarchy is built on top of a set of base framework types, which defines most of the mappings to the physical types. The derived types will then typically specialize the base types according to the business domain structure. Using the same logical types in the model helps to ensure consistency between different system's elements both vertically and horizontally. For example, if you define a user name to be of a certain length then all generated database columns that contain a user name will have consistent lengths and appropriate validations to restrict the length could be added to the corresponding editing UI controls or business layer fields. By the same token, any Boolean field can be consistently represented by the same SQL type (e.g. bit) or a UI control (e.g. checkbox).

Enumerations

Enumerations are used to describe a static set of possible values that can be later associated with any logical type. In addition to listing the items that constitute the enumeration, the present method allows defining any number of additional properties that such items may have and further specifying these properties for each item in the enumeration. This allows building rich object models for very complex software systems.

Figure 3:
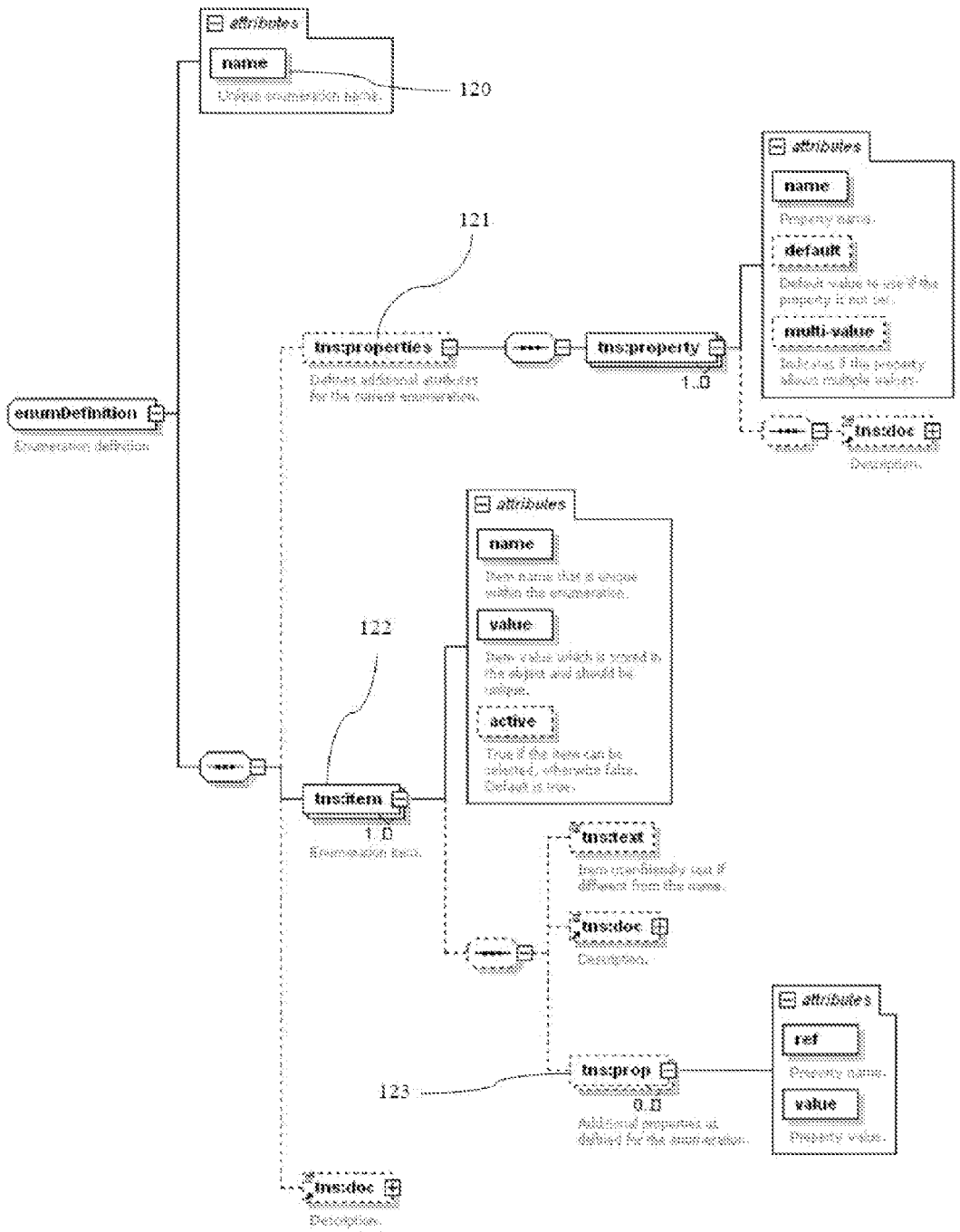
FIG. 3 is a block diagram illustrating the structure of enumerations defined in the model.

FIG. 3 illustrates the structure of enumerations defined in the model. Each enumeration has a unique name 120 that allows referencing it from within the model. The definitions of additional item properties 121 include the property name, an optional default value and whether or not items may have multiple values for the property. Each item 122 in the enumeration may have a unique name that identifies the item, the item actual value and an optional list of additional property values 123.

Field-Sets

Field-sets define named groups of fields in the model that can be used for one or multiple object definitions. On one hand, field-sets provide a mechanism for declaring composite object keys, which can be referenced by other objects thus establishing a foreign key relationship. On the other hand, they enable support for reusability where the same set of fields is used by many objects. This comes in handy in aspect-oriented designs. If, for instance, most or all of your objects are supposed to have a modification stamp, which can include a timestamp and the user of object's creation and the last update, then you will be able to declare a field-set with these four fields and then just reference it in every object.

Figure 4:
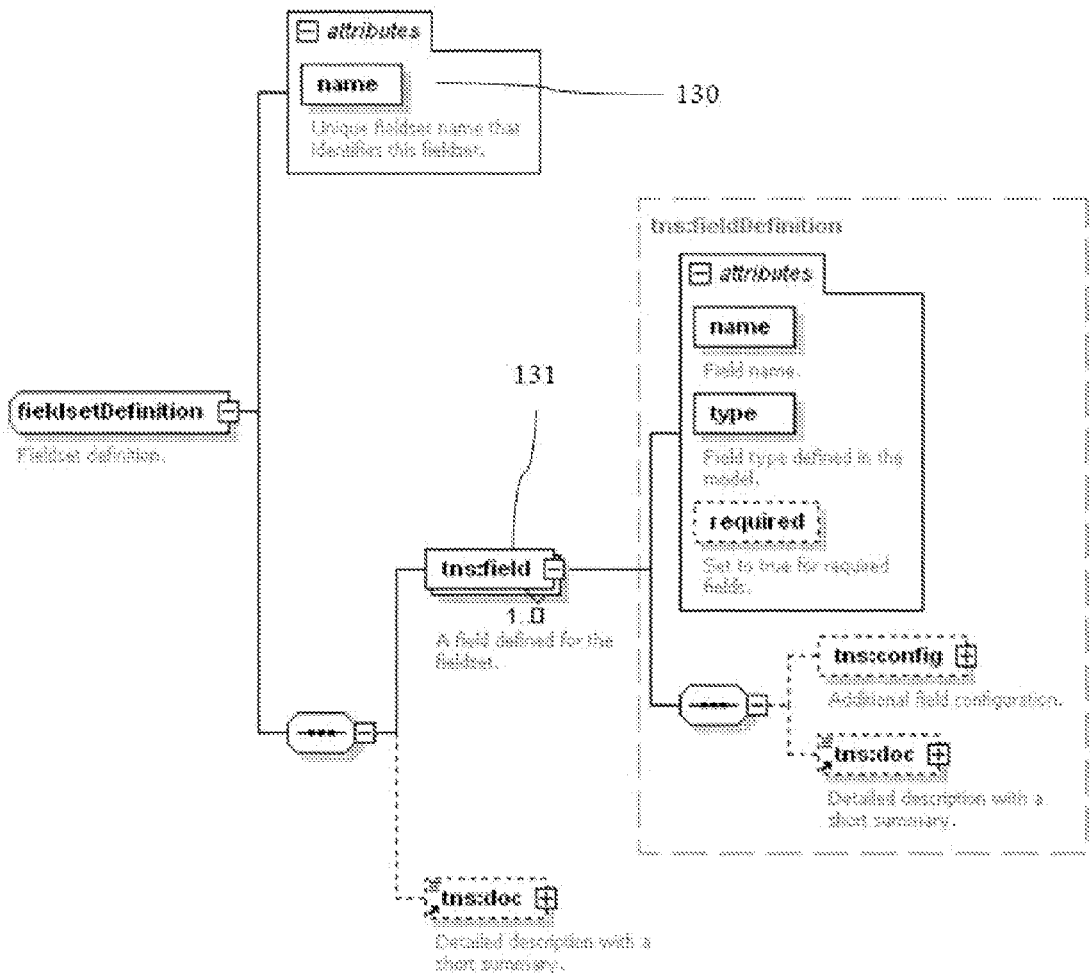
FIG. 4 is a block diagram illustrating the structure of field-sets defined in the model.

FIG. 4 illustrates the structure of field-sets defined in the model. Each field-set has a unique name 130 that allows referencing it from within the model and one or more named fields 131 that reference a logical type defined in the model.

Structures

Structures represent a nested set of simple typed parameters or other complex structures and are used to describe business object operations. The structures can be defined either as stand-alone reusable named entities that can be referenced from within the model or in-line as part of the containing structure or a business object operation.

Figure 5:
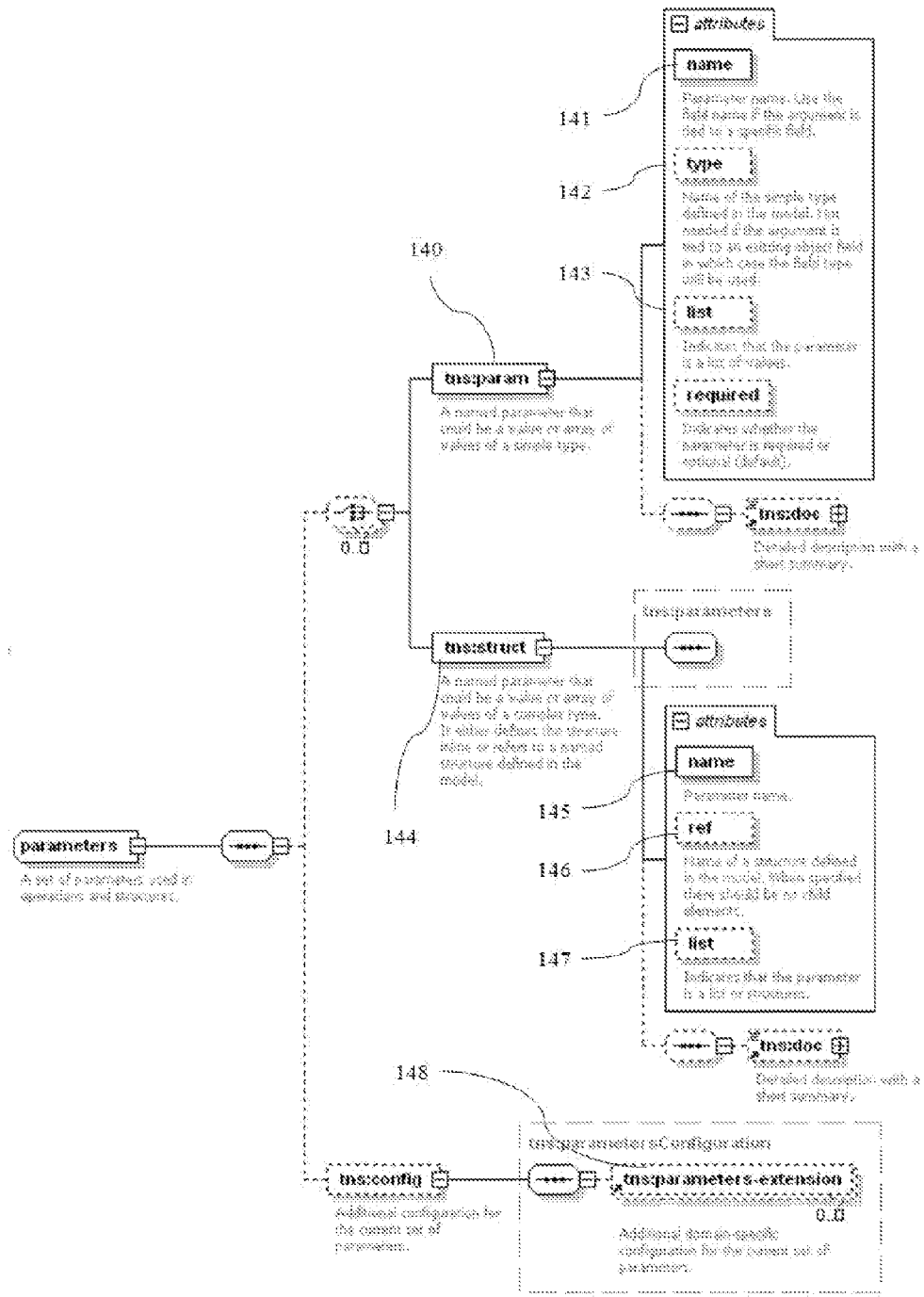
FIG. 5 is a block diagram illustrating a reusable structure of a set of parameters that is used by definitions of both standalone structures and input or output structures of business object operations.

FIG. 5 illustrates the key components of such a structure. Each simple parameter 140 has a name 141 and a logical type 142 as well as a flag indicating if it assumes a scalar value or a list of values 143. Similarly, a structure may contain other nested structures 144, which also has a unique local name 145 within the containing structure, a flag indicating if this is a list 147, and either a reference to an existing structure 146 or the definition of the structure in-line. In addition, the structures have an extension point 148 where additional configuration may be provided, such as the presentation data objects that this structure should be a part of.

Business Objects

Figure 6:
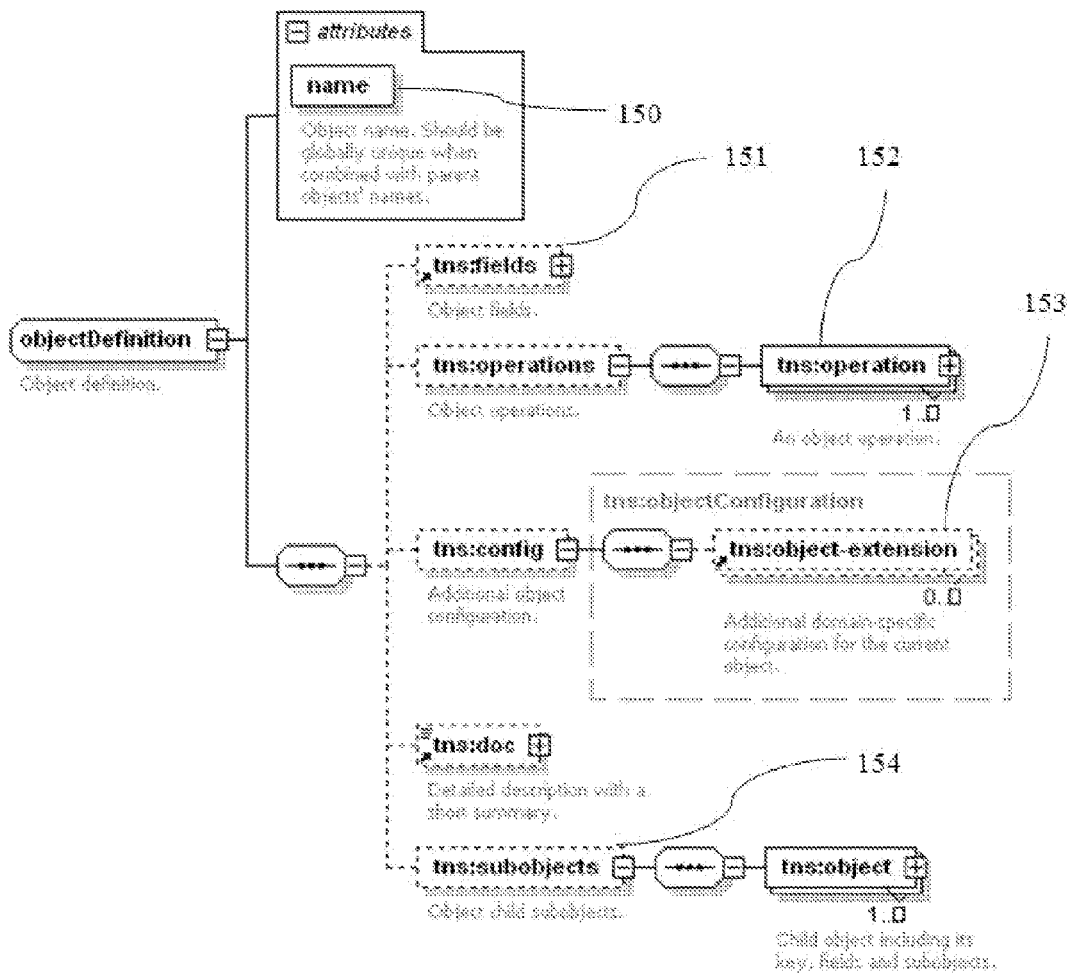
FIG. 6 is a block diagram illustrating a general structure of business objects defined in the model.

At the core of the model is the definition of business objects as depicted on FIG. 6, which consists of the object name 150 followed by a list of fields 151 that can be declared as a mix of individual fields or references to reusable field-sets that are declared separately in the model. Each business object may define a set of operations 152 that it supports, such as create, read, update and delete (CRUD) etc., and has an extension point 153 where additional configuration may be specified, such as mappings to physical tables or attributes of the service that is generated from the object operations.

In addition to the list of fields and operations an object may consist of a number of sub-objects 154 (also referred to as child objects), whose definitions are nested inside the definition of their parent object. Unless the child object's key is serial and hence unique, the parent's key is automatically included into the child's key. There is also an implicit foreign key relationship between the child and the parent objects.

Figure 7:
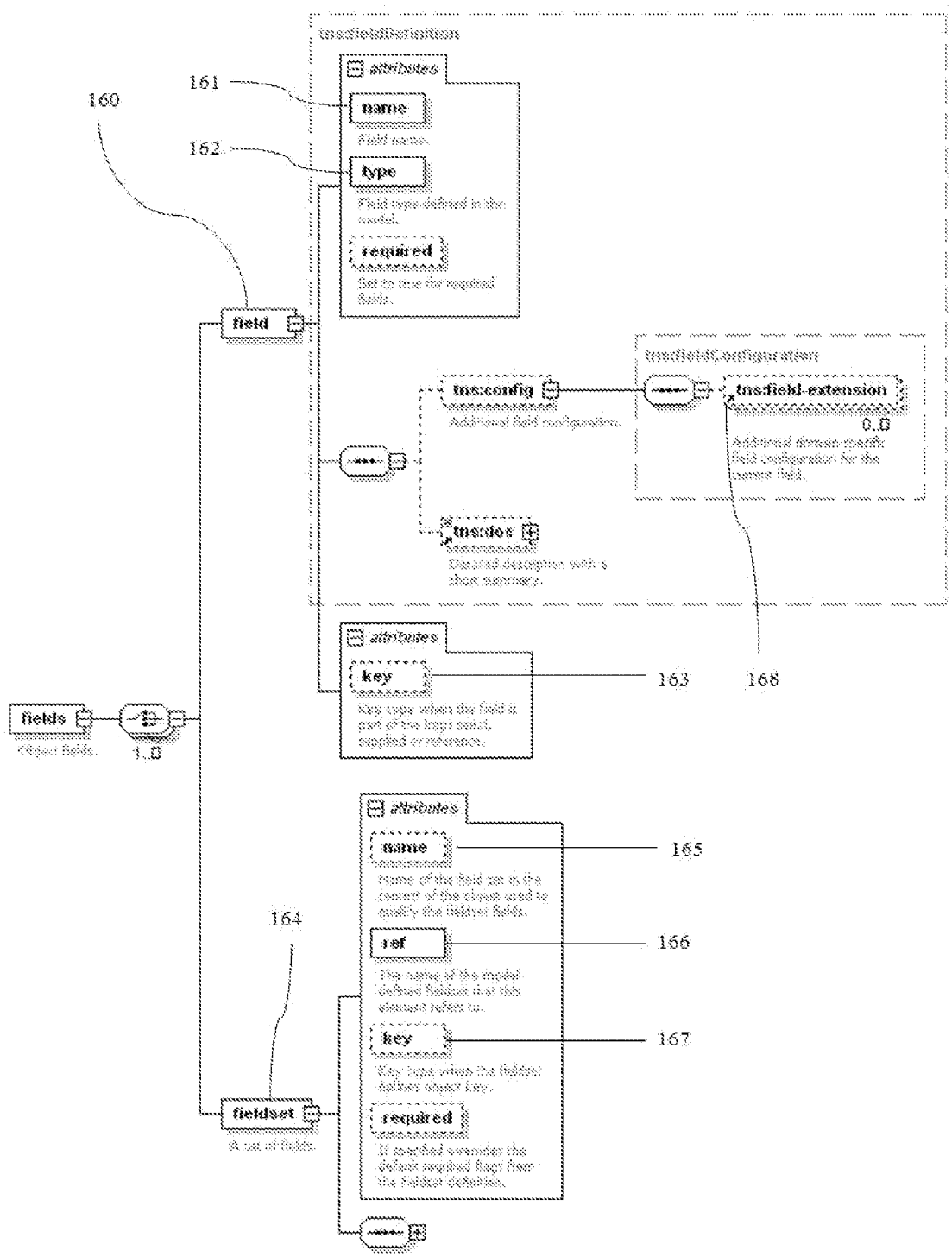
FIG. 7 is a block diagram illustrating the structure of business object fields.

FIG. 7 illustrates the structure of object fields comprised of a mix of regular fields 160 and reusable field-sets 164. Both fields and field-sets have unique names 161 and 165 within the object. Each field has a type attribute 162 and each field-set has a reference 166 to a corresponding field-set defined in the model. Each field also provides an extension point 168 where additional field-specific configuration may be specified, such as mappings to database columns, etc.

One of the fields is typically marked as a key 163 with a specifier whether this is a serial auto-generated key, a user-supplied key or a reference to another object's key. Unless it's a reference to another key, the key field should use a dedicated type that no other object uses for its key type. This way whenever any other field is using this type or any type derived from it, it will be automatically considered as referencing this object and a foreign key will be generated unless specifically overridden by the field configuration. Composite keys are defined in a similar way where a field-set reference on the object is marked as a key 167.

Figure 8:
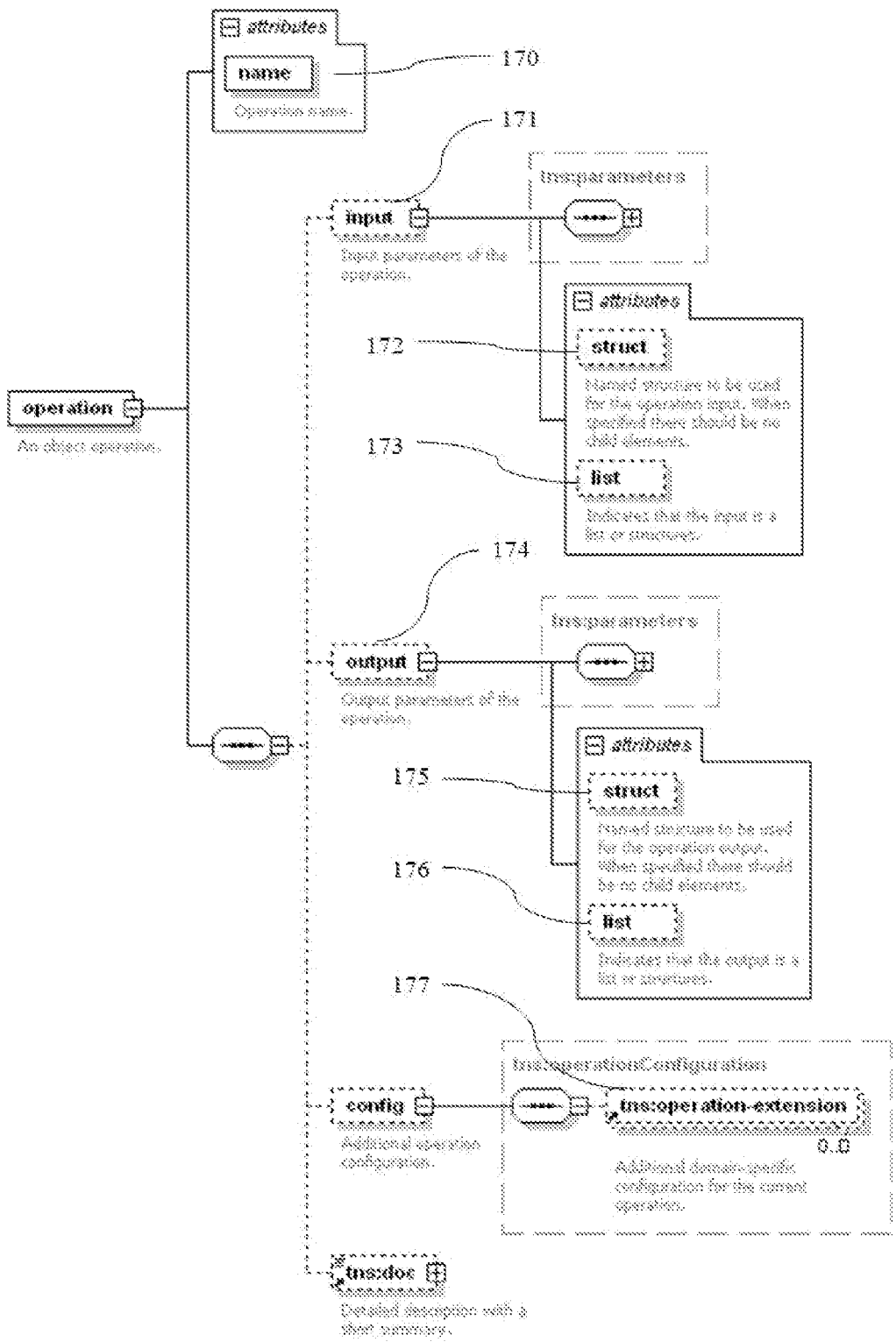
FIG. 8 is a block diagram illustrating the structure of business object operations.

FIG. 8 illustrates the structure of business object operations. Each operation has a name 170 and definitions of its input 171 and output 174 structures where applicable. The input/output structures can be defined in-line with a nested set of parameters (as in FIG. 5) or just reference any existing standalone structure 172 and 175. They also support a list flag 173 and 176 indicating if the structure represents a list of values. With business object operations defined like this it is possible to generate a whole service layer of arbitrary complexity for multi-tiered applications, where the service layer may actually be tailored to the client interfaces and not be tied to the underlying business object model. Each operation also provides an extension point 177 where any additional operation-specific attributes may be specified, such as transactional, security, serialization or error handling properties.

Figure 9:
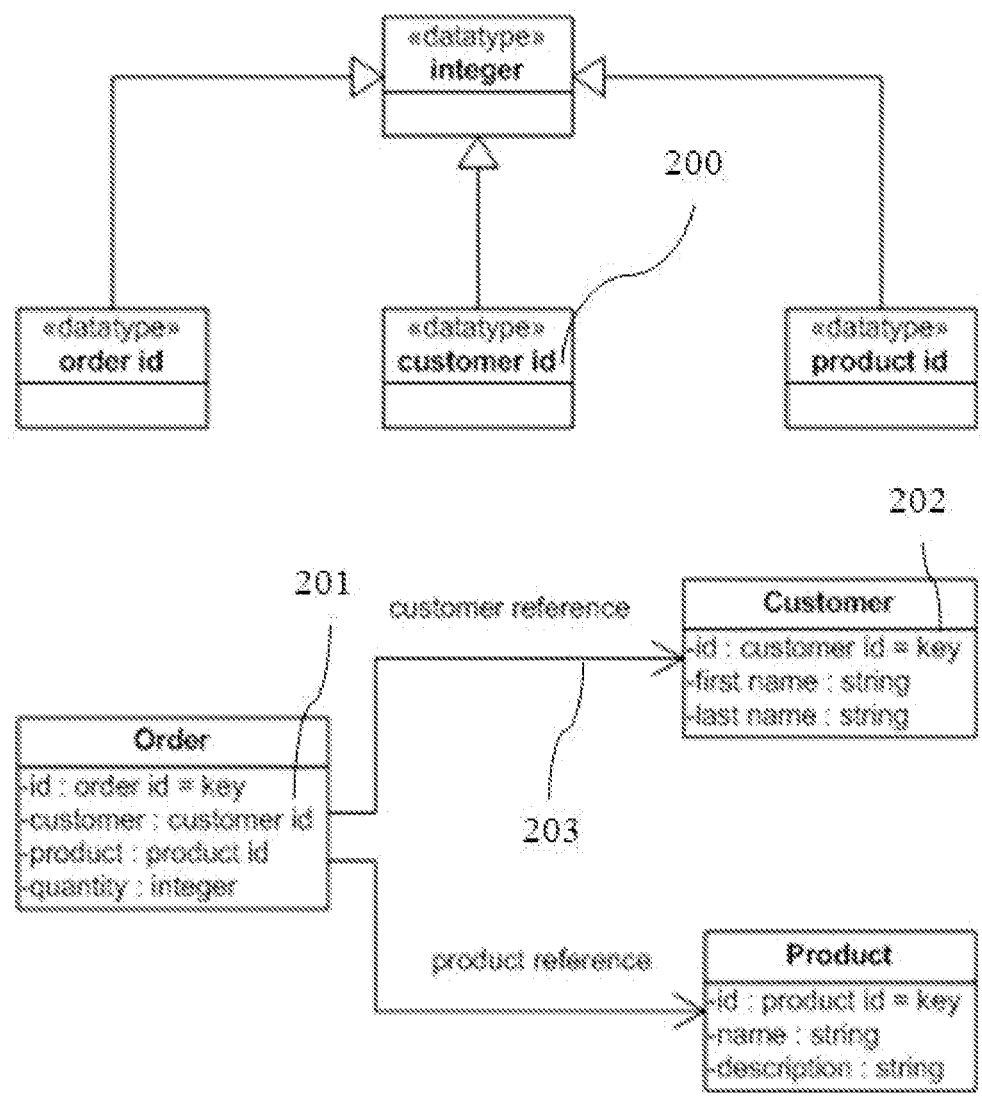
FIG. 9 is a block diagram illustrating a method of deriving business object relationships from the types of their fields.

FIG. 9 illustrates a method of deriving business object relationships from the types of their fields. The key field id 202 of a Customer object is using a dedicated type customer id 200, which no other object can use for its key. This way, whenever any other object, such as Order, has a field with a type customer id 201, this will automatically establish a reference to the Customer object 203 without having to specify it explicitly.

Figure 10:
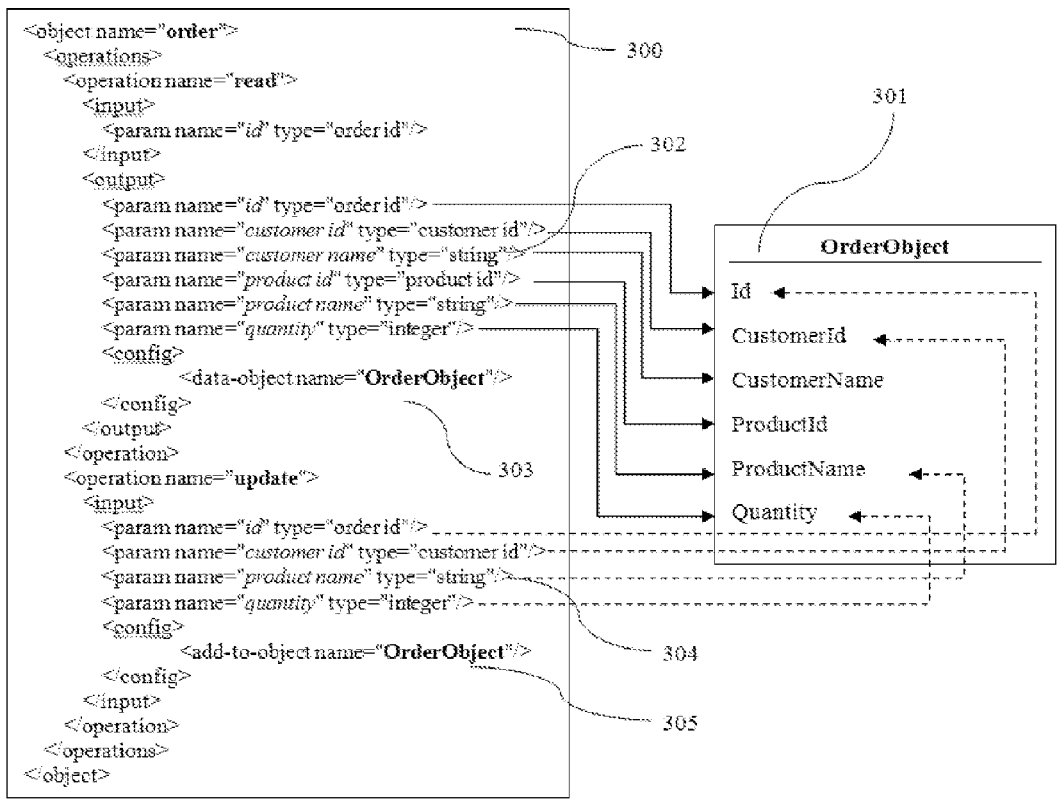
FIG. 10 is a block diagram illustrating a method of generating presentation objects from the structures of business object operations.

FIG. 10 illustrates a method of generating presentation objects from the structures of business object operations. At the core of the method lies an idea that in multi-tiered systems where the presentation layer communicates with the business object layer through a service layer, the latter is much more suitable for generation of the presentation layer than the actual business object layer. If you think about it, the data for the user interface data model needs to be read from a service or will be sent to a service for updates and therefore is based on the structure of the service operations. At the same time, the service operation parameters may not necessarily have corresponding fields in the domain model or may span across multiple business objects, where the service implementation translates operation parameters to and from business object fields. For example, a read operation for an order object 300 may return a customer name 302, which is not a field of the order and is taken from the associated customer object. Similarly, update operation may supply a unique product name 304, which the service internally will resolve into internal product ID to be stored on the order.

For any set of parameters in operation structures, the present method allows specifying which presentation objects these parameters should be part of. In the current example the structures of the read and update operations are declared to be part of the presentation object OrderObject 301 in their additional configurations 303 and 305. Parameters with the same names from both operations are translated into a single property on the presentation object as long as their types are the same.

CITATION LIST

Patent Literature

| | | | |
|---|---|---|---|
| 7,363,578 | B2 | June 2004 | Bendsen et al. |
| 2006/0130011 | A1 | October 2004 | Cornell et al. |
| 2006/0064667 | A1 | September 2004 | Freitas |
| 2007/0266041 | A1 | August 2006 | Beckman et al. |

Non Patent Literature

Xomega Technology, 2010, http://www.xomega.net
Model-driven architecture, Wikipedia, June 2010, http://en.wikipedia.org/wiki/Model-driven_architecture
"ADO.NET Tech Preview: Entity Data Model", Microsoft Corporation, June 2006, http://msdn.microsoft.com/en-us/library/aa697428(VS.80).aspx

What is claimed is:

1. A method of defining a business object model comprising:
   defining a plurality of named logical types, field-sets, business objects and sub-objects, structures and enumerations that are referenced in the model by their names, wherein defining the business objects further comprises listing the plurality of their fields, each field having a type attribute referencing a logical type defined in the model, and field-sets, each field-set referencing a corresponding field-set defined in the model and the plurality of business object operations and sub-objects;
   wherein defining business objects and sub-objects further comprises marking a single field or a field-set with a key attribute, which indicates that the key is serial (for fields only), or is user-supplied, or is a reference to another object's key attribute; and
   wherein no two objects can both have their key fields marked as serial or marked as user-supplied with the same logical types, and wherein no two objects can both have their key field-sets marked as user-supplied and as referencing the same field-set defined in the business object model.

2. The method of claim 1, wherein defining each logical type further comprises specifying extensible mappings to a plurality of other platform-specific types or entities associated with the logical type including, but not limited to, database column types, programming language types, user interface control types and logical types for other kinds of models.

3. The method of claim 1, wherein defining logical types further comprises specifying a base type referencing another logical type defined in the model where applicable, wherein any configurations or mappings that are not specified in the current logical type, are considered as inherited from its base type or any of the base types thereof.

4. The method of claim 1, wherein defining logical types further comprises specifying a reference to an existing enumeration defined in the model, where applicable.

5. The method of claim 1, wherein defining field-sets further comprises listing the plurality of their fields, each field having a type attribute referencing a logical type defined in the model.

6. The method of claim 1, wherein defining structures further comprises listing the plurality of:
   parameters, each parameter having a type attribute referencing a logical type defined in the model, and a flag specifying if it is a scalar value or a list values;
   contained structures, wherein each contained structure either references a corresponding structure defined in the model or is defined in-line; and
   any additional extensible configuration including, but not limited to, references to presentation objects that this structure is a part of.

7. The method of claim 1, wherein defining each field of a business object or a field-set further comprises specifying additional extensible configuration for the field including, but not limited to, a mapping to a corresponding database column and a foreign key behavior where applicable.

8. The method of claim 1, wherein defining enumerations further comprises
   defining additional properties that each enumeration item may have;
   listing the enumeration items; and
   specifying the property values for the items, each property being one of the properties defined for the current enumeration.

9. The method of claim 1, wherein defining operations for business objects and sub-objects further comprises defining their input and output structures where applicable, which comprises listing the plurality of:
   parameters, each parameter having a type attribute referencing a logical type defined in the model, and a flag specifying if it is a scalar value or a list values;
   contained structures, wherein each contained structure either references a corresponding structure defined in the model or is defined in-line; and
   any additional extensible configuration including, but not limited to, references to presentation objects that this structure is a part of.

10. The method of claim 1, wherein defining business objects and sub-objects further comprises specifying additional extensible configuration for the objects including, but not limited to, mappings to corresponding database tables and custom service attributes where applicable.

11. The method of claim 1, further comprising generating a relational model from the business object model by generating a plurality of table definitions and foreign key constraints between the said tables.

12. The method of claim 11, wherein generating the plurality of table definitions further comprises generating the primary keys for said tables, wherein the primary keys are based on the corresponding object fields or field-sets that are marked with a key attribute and also include the primary key of the parent object if the table is based on a sub-object that has a non-serial key.

13. The method of claim 11, wherein generating the plurality of foreign key constraints further comprises using a field type to find an object with a key field of the same type or any of base types thereof, that object providing the referenced table definition for the foreign key constraint.

14. The method of claim 11, wherein generating the plurality of foreign key constraints further comprises using objects' contained field-sets to find an object with a key field-set referencing the same field-set defined in the business object model, that object providing the referenced table definition for the foreign key constraint.

15. The method of claim 11, wherein generated table names are based on additional configuration for the corresponding object or on the object fully qualified name if no such configuration is provided and generated column names are based on additional configuration for the corresponding object field or on the field name if no such configuration is provided.

16. The method of claim 1, further comprising generating a presentation data model from business object model by generating a plurality of presentation objects based on a plurality of structures defined in the business object model.

17. The method of claim 16, wherein generating the plurality of presentation objects further comprises building a plurality of properties for each presentation object, the plurality of properties based on parameters of the plurality of business object model structures that are either part of input/output structures of business object operations or part of standalone structures defined in the business object model, wherein each of the plurality of structures is configured to be a part of the current presentation object.

18. The method of claim 17, wherein parameters that have the same name result in a generation of a single presentation object property as long as their types are the same; otherwise an error is reported.

* * * * *